United States Patent [19]

McIntyre et al.

[11] Patent Number: 5,715,487
[45] Date of Patent: Feb. 3, 1998

[54] CAMERA AND CARTRIDGE WITH PASSWORD PROTECTION

[75] Inventors: Dale Frederick McIntyre, Honeoye Falls; J. Kelly Lee, Brighton, both of N.Y.

[73] Assignee: Eastman Kodak Company, Rochester, N.Y.

[21] Appl. No.: 614,077

[22] Filed: Mar. 12, 1996

[51] Int. Cl.⁶ ............................ G03B 17/24; G03B 1/18
[52] U.S. Cl. .................. 396/299; 396/297; 396/536; 396/266
[58] Field of Search .............................. 354/105, 106, 354/266, 271, 288, 289.1; 396/266, 502, 503, 535, 536, 538, 297, 299

[56] References Cited

U.S. PATENT DOCUMENTS

| | | | |
|---|---|---|---|
| 4,105,156 | 8/1978 | Dethloff | 235/441 |
| 4,965,626 | 10/1990 | Robison et al. | 355/40 |
| 5,210,571 | 5/1993 | Peloquin et al. | 355/203 |
| 5,375,243 | 12/1994 | Parzych et al. | 395/725 |
| 5,398,087 | 3/1995 | Kazami et al. | 354/21 |
| 5,418,585 | 5/1995 | Petruchik et al. | 354/76 |
| 5,481,325 | 1/1996 | Wada et al. | 354/288 |
| 5,510,777 | 4/1996 | Pilc et al. | 340/825.31 |

FOREIGN PATENT DOCUMENTS

| | | |
|---|---|---|
| 57-111522 | 7/1982 | Japan . |
| 62-276530 | 12/1987 | Japan . |

*Primary Examiner*—Safet Metjahic
*Assistant Examiner*—Michael Dalakis
*Attorney, Agent, or Firm*—Edward Dugas

[57] ABSTRACT

A password protected camera system, comprising a camera incorporating, means for receiving user entered passwords for controlling access to the camera's features and to the film cartridge is disclosed. The camera incorporates circuitry for writing and reading password data to and from the camera film to control access to the film when it is in the camera and when it is removed from the camera. Different levels of access are provided either by multiple passwords, one for each level, or by single passwords, where multilevel access is granted with one password while another password may limit access to just one level.

6 Claims, 12 Drawing Sheets

CAMERA AND CARTRIDGE WITH PASSWORD PROTECTION

FIELD OF THE INVENTION

The present invention relates generally to the field of cameras, and in particular to password protecting access to a camera's operating functions and to an associated film cartridge both when in the camera and when removed from the camera.

BACKGROUND OF THE INVENTION

As cameras increase both in complexity and value, they become more susceptible to theft and to misuse. Offsetting attempts to providing security for the camera is the need to have the camera always ready for use Kodak and others have recently announced the release of a new advanced photographic system that utilizes a drop-in film cartridge having a film strip that contains a layer of transparent magnetic recording media for recording camera and picture taking information. This new system provides the consumer with a convenient way to manage negatives for storage by keeping the negatives within the original cartridges until needed for display or for reprinting purposes. Shortly devices will be available that will accept the cartridge for accessing of the images on the processed negative film strip for display on television such as the recently announced Fuji (PMA '96) Ap-1 Photo Player and for converting those images into computer usable image formats such as a PhotoCD™, TIFF, GIF, PICT, etc. with devices such as the Fugi As-1 Image Scanner for Home PC.

Given the cartridge's convenience and size and its anticipated accessibility, consumer's photos will be faced with a risk of piracy. A cartridge left unsecured will be susceptible to unauthorized reproduction or display. This problem is exacerbated by the speed and ease with which a computer operator can acquire and manipulate an image. In the past professional photographer's images were primarily the images that were pirated, but with the wide spread use of this new advanced photographic system more people will inadvertently join the ranks of the professional in terms of the quality of their pictures. It therefore would be advantageous to have an advanced copy protection system that would be able to exercise ownership control over the use of the camera and any film cartridges used by the camera both when the cartridge is installed in the camera and when it is removed from the camera. Additionally, because most cameras are used by a number of people within a family it is also desirable to control the access to certain features of the camera to prevent accidents, particularly by children. The present inventive password protection system accommodates multiple levels of password protection to provide access to certain functions and to limit access to others.

SUMMARY OF THE INVENTION

The present invention is directed to overcoming one or more of the problems set forth above. Briefly summarized, according to one aspect of the present invention, there is provided a password protected camera system, comprising:

a camera incorporating, means for receiving user entered passwords and for controlling access to camera features as a function of an entered password;

said camera also incorporating, means for writing and reading password data to and from a camera film;

means for requesting film access by the use of a password; and means for limiting access to said film to those having a password corresponding to at least one of the camera's passwords.

From the foregoing it can be seen that it is a primary object of the present invention to add at least one level of password protection to an image capture apparatus such as a camera and its associated film cartridge to prevent their unauthorized use.

It is another object of the present invention to incorporate multiple levels of password protection whereby several people will have different passwords which have different access privileges.

It is another object of the present invention to provide the camera system with speech recognition as the methodology for inputting a password.

A further object of the present invention is to provide a system wherein the password is written onto the magnetic layer of the film where it will control the display and printing of the images captured on the film.

These and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has at least the following advantages:

Password protection is added to the magnetic layer of the filmstrip to prevent the unauthorized viewing or the outright piracy of the images recorded on the filmstrip;

Password protection on the camera prevents the removal of, or use of, the film cartridge with the camera.

DETAILED DESCRIPTION OF THE INVENTION

Figure 1:
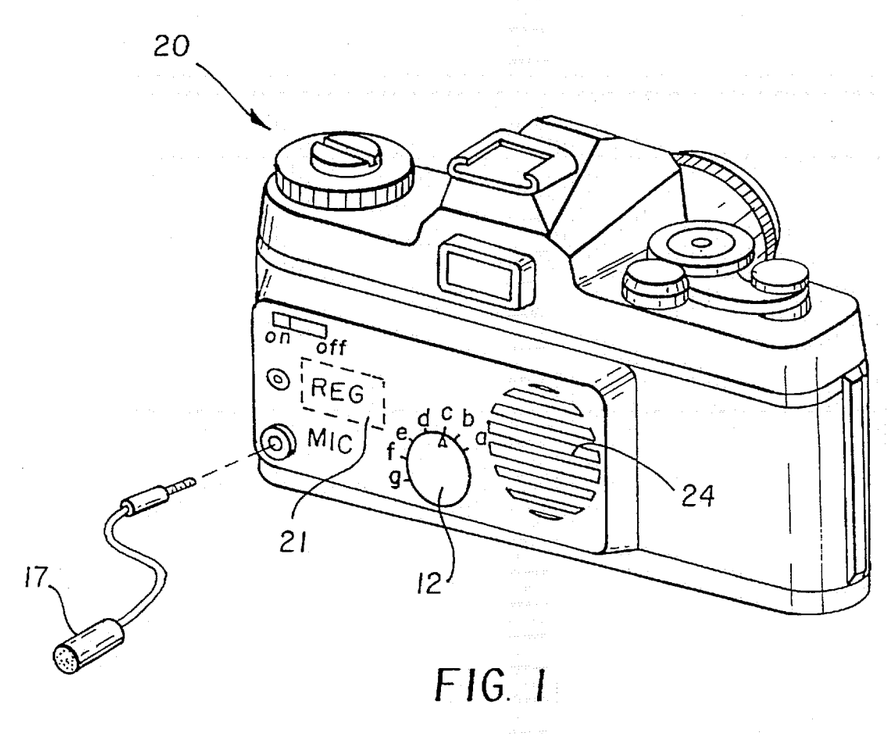
FIG. 1 is a perspective back view of a camera incorporating features of the present invention.

Referring to FIG. 1, a camera 20, of the type designed to receive the new drop-in film cartridges, is provided with a speech recognition chip 21 that may be accessed by means of a plug in microphone 17 or a built in microphone (not shown for clarity). Audio output is by means of a speaker 24. Camera function selections may be achieved using any of a number of well known input devices such as a function switch 12 or a set of key pads 22, shown in the camera arrangement of FIG. 6 and in the generalized camera electronic block diagram of FIG. 2.

Figure 2:
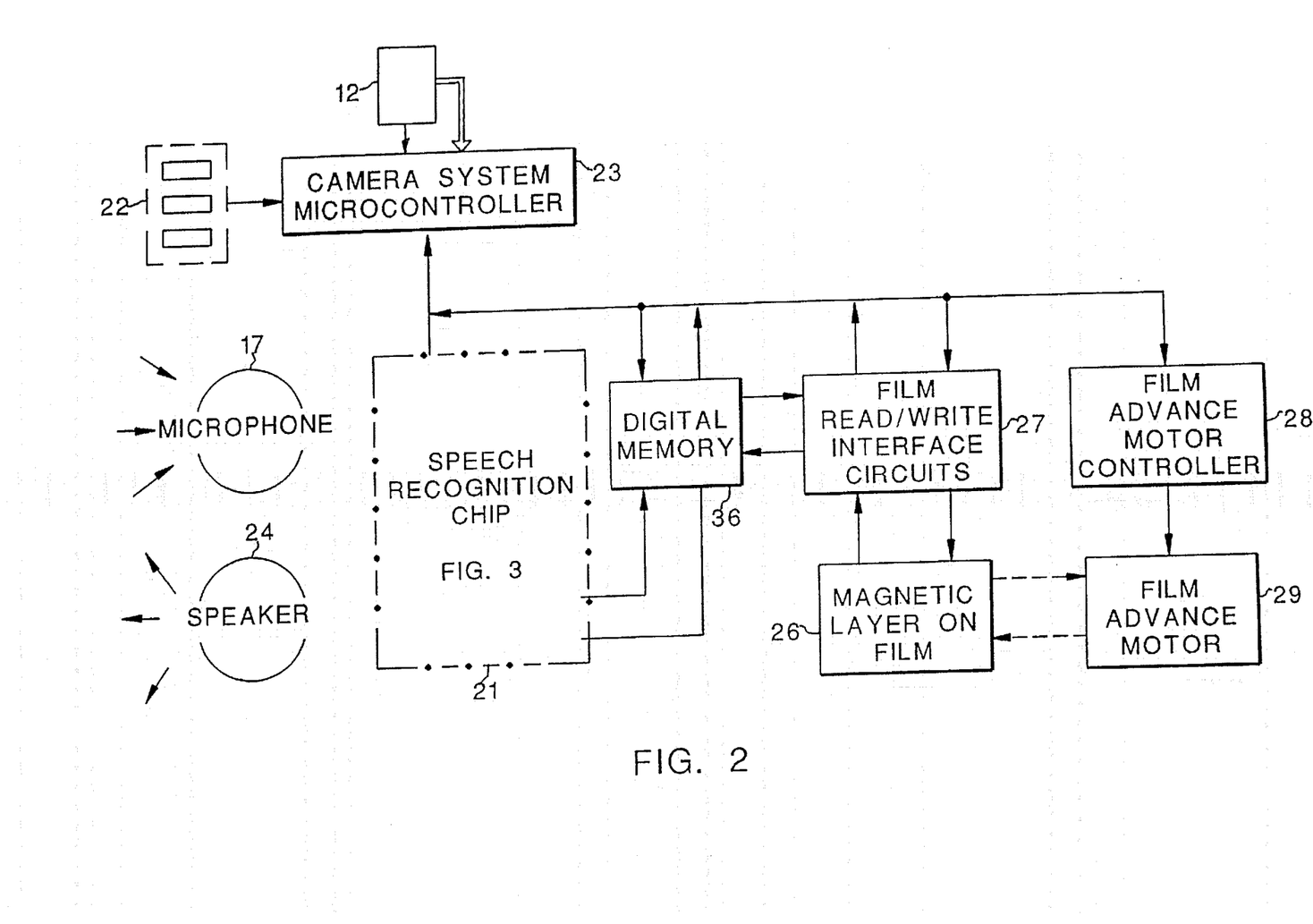
FIG. 2 is a block diagram of the electronics incorporated in the camera of FIG. 1.

Referring now to FIG. 2, it is to be appreciated that a specific arrangement of the electronics used within the camera is shown for the purposes of providing an enabling embodiment and that other variations in the electronics may be utilized by those of ordinary skill in the art without detracting from or diminishing the inventors' contribution. In the preferred embodiment of this invention a speech recognition chip 21 is used to recognize a users' voice and/or a password. Additionally, the chip provides for sound output and optionally may be used to provide for some ancillary camera control functions. A chip that may be used as chip 21 is manufactured and sold by SENSORY Circuits, Inc. of San Jose, Calif. bearing their part No. RSC-164. Another chip that may be used for chip 21 is manufactured by Texas Instruments with part No. TMS3477. The chip 21 receives the output of the microphone 17 and compares that output against a file of authorized voices and/or authorized code words. Various instruction prompts are provided to a user via the speaker 24. The key pad 22, if optionally installed on the camera 20, may also be used to input a password to the chip 21 via a camera system microcontroller 23 that is in turn connected to the chip 21. In the standard arrangement of the camera's electronics the function switch 12 inputs the operator's function selections to the camera system microcontroller 23. Under control of the camera system microcontroller 23 a film cartridge inserted into the camera 20 has its film strip advanced by a motor controller 28 driving a film advance motor 29. This in turn places the film's magnetic layer 26 into proper film reading and/or writing positions with respect to the film read/write interface circuits 27. A digital memory 36 is used to store camera programs along with passwords that may be changed from time-to-time. Digital memory 36 may be a RAM such as a Hitachi HM628128. Additional RAM and ROM storage is available on the chip 21 and it is a matter of choice by the camera's manufacturer as to where a program is stored. The chip 21 is also provided with access to the digital memory 36.

Figure 5A:
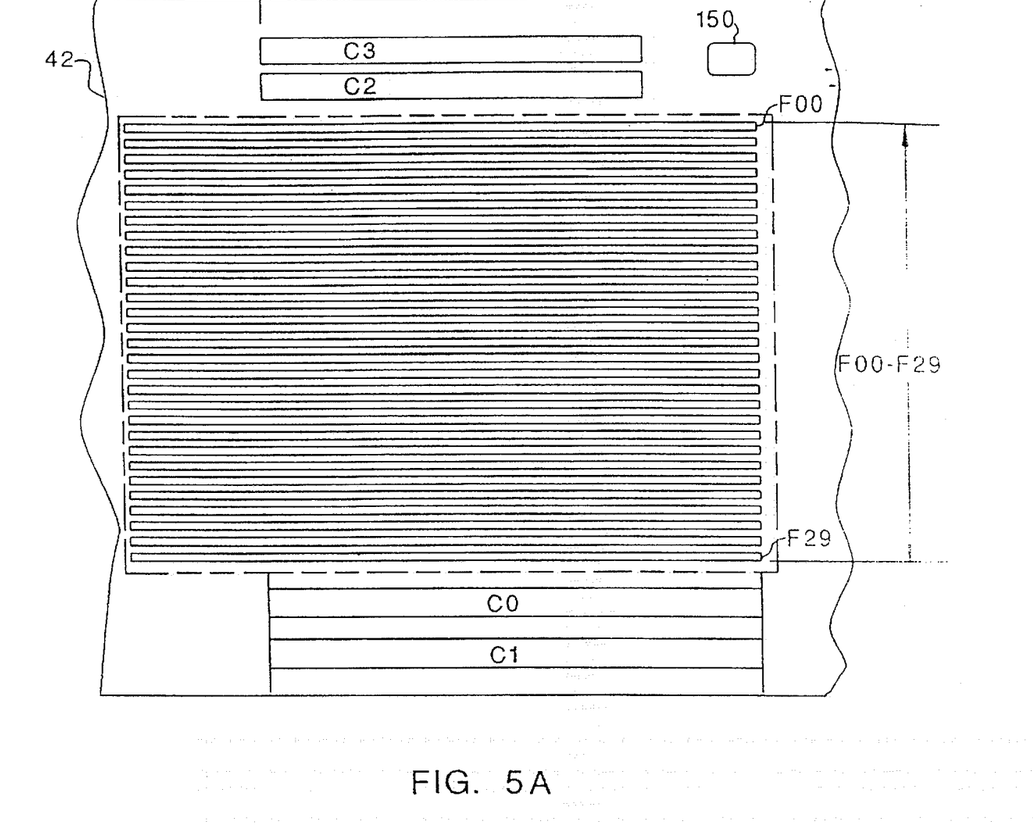
FIGS. 5A and 5B illustrate a section and a cross section of a film strip, respectively, displaying magnetic data recording layers.
Figure 5B:
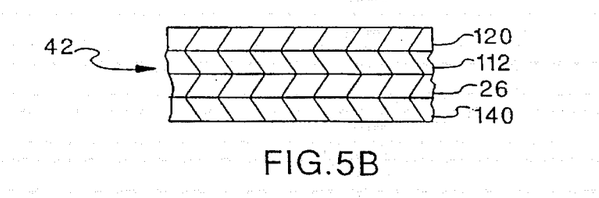

Another function of digital memory 36 is to serve as a temporary storage for the message associated with an individual exposed image frame after voice recognition is completed and prior to recording the message on the magnetic layer 26 of film strip 42 (See FIGS. 5A and 5B). For this purpose, digital memory 36 is coupled by the microcontroller 23 in the "write" mode to film read/write interface circuits 27 to record the stored audio data onto the magnetic layer 26. The film advance motor controller 28 operates at appropriate times to cause film advance motor 29 to advance the film strip 42 in either the frame-to-frame direction or in the film prewind/rewind direction, the latter depending on the nature of the camera involved. The messages in digital memory 36 are recorded in the magnetic layer tracks during such film advancement.

Figure 3:
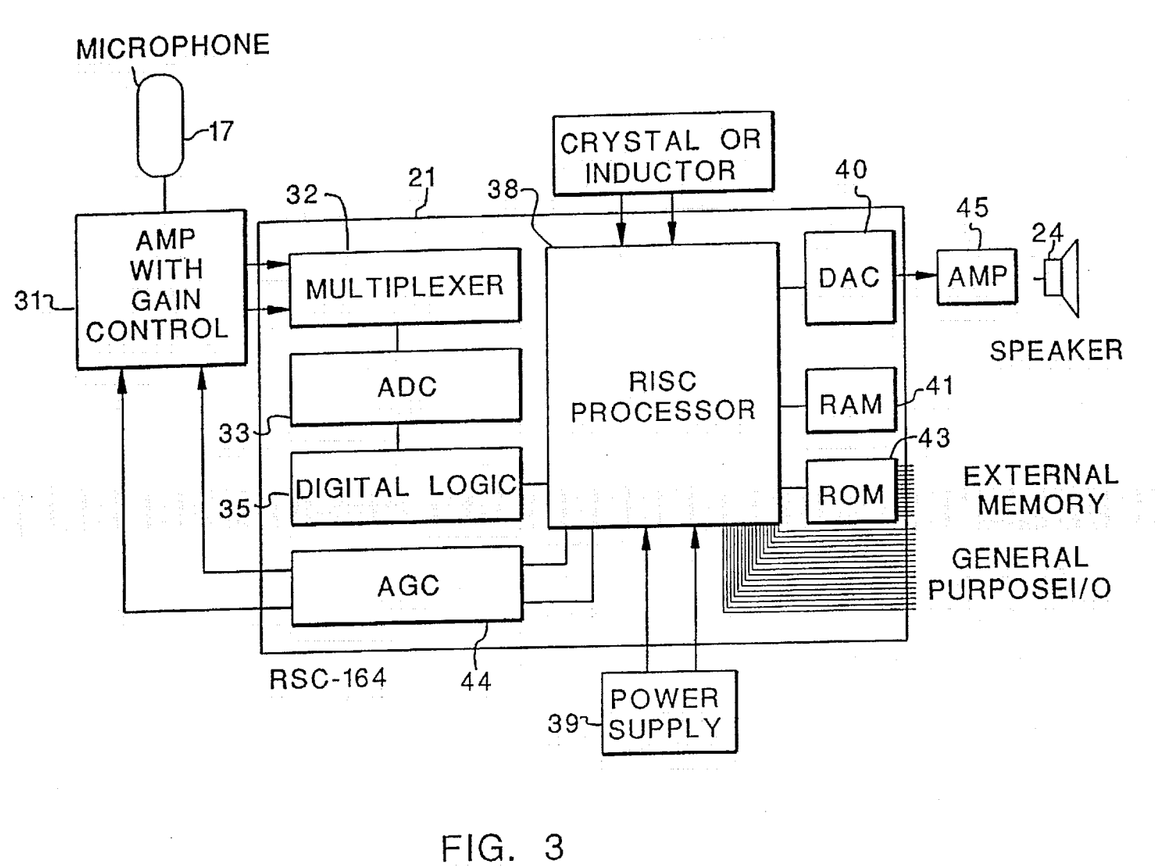
FIG. 3 is a block schematic diagram of a chip that may be used for the speech recognition portion of the electronics illustrated in FIG. 2.

The functional details of chip 21 are set out in block circuit schematic form in FIG. 3. the microphone 17 inputs audio into an amplifier 31 which in turn outputs the audio signals to a multiplexer 32. The multiplexer 32 performs two functions: One is to input the analog signal; The other is to connect the output of the amplifier 31 in a feed-back loop to an Automatic Gain Control (AGC) circuit 44 for controlling the gain of the amplifier. The analog input, when switched through the multiplexer 32, is connected to digital signals by way of an Analog-to-Digital Converter (ADC) circuit 33. A digital logic circuit 35 receives the digitized audio signals and logically places the digitized signals into a form useful to the chips main processor (RISC Processor) 38. Ancillary circuits such as the power supply 39, DAC 40, RAM 41 and ROM 43 provide the necessary interfaces between the RISC Processor 38 and the camera circuitry of FIG. 2. An amplifier 45 powers the speaker 24 with the output from the DAC 40.

Figure 4:
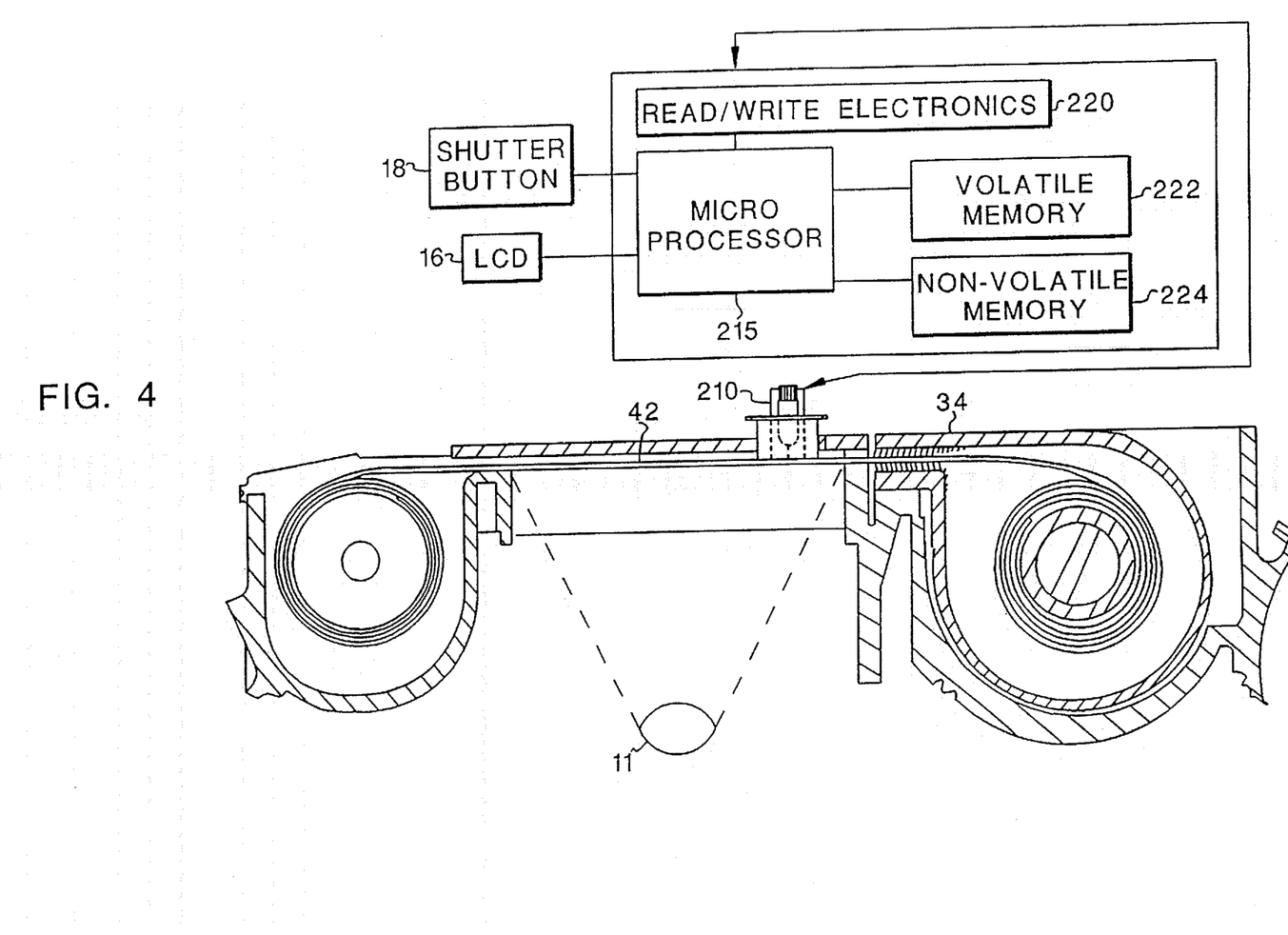
FIG. 4 illustrates the camera in cross section to show the film path and the associated read/write, store, and display electronics.

FIG. 4 provides a cut away view of a camera that is configured to read and to write information onto/into the magnetic layer 26 of a film strip 42, extending from a film cartridge 34. A lens 11 focuses light onto the film strip 42 to form images with the film being advanced from the cartridge 34 by means of a drive motor not shown in this figure. A row of magnetic read/write heads, shown generally as 210, is connected to a microprocessor 215 and associated volatile and non-volatile memories 222 and 224 respectively, and read/write electronics 220 to perform the functions enabled by the camera 20. A shutter button 18 is used to activate the camera's shutter (not shown for purposes of clarity). An LCD 16, or other type of display provides the user with an indication of the operating status of the camera.

FIGS. 5A and 5B provide the viewer with an understanding of the construction of the new system's film strip. Each frame of the film strip is provided with a transparent overlay of magnetic tracks labeled generally as F00 to F29 and C0–C3. The magnetic read/write heads 210 correspond in number to the number of these tracks, namely one read/write head is assigned to perform its function with one magnetic track. Tracks C0 to C3 are used to provide processing data to a film processor after the film has been exposed. Additionally a perforation 150 is provided to supply a reference point that can be used to align each frame of film with respect to a reader/writer and picture taking aperture.

FIG. 5B illustrates the layers that are used to form the film strip. A film strip 42 of magnetically coated film, useful in the present invention, includes a base 112, various well-known photo-chemical layer 120 on one side of the base 112, and a virtually transparent magnetic layer 26 on the other side. An anti-static and lubricating layer 140 overlies the transparent magnetic layer 26.

Figure 6:
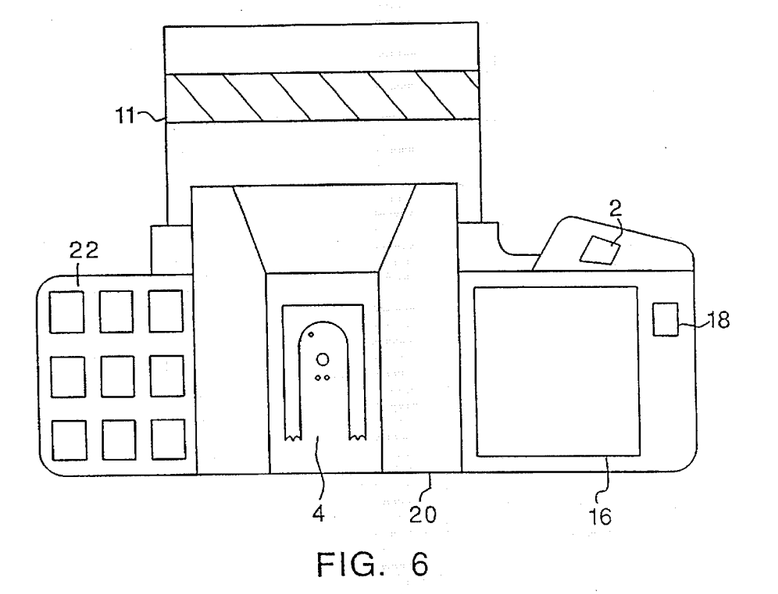
FIG. 6 is a top view of a camera incorporating data input keys to enable entry of passwords.

A variant of the camera of FIG. 1 is shown in FIG. 6. This variant illustrates the positioning of a plurality of key pads 22 that are used to enter the assigned multi-level camera passwords. The other features shown are the standard LCD display 16 a shutter button 18, a lens 11, film index window 2, and a flash hot shoe 4. Two variations of a camera that can incorporate the present invention have been shown with the understanding that many variations in the physical arrangements of the cameras may be had without departing form the spirit of the present invention.

The inner electronic workings of the camera 20 will be described in conjunction with the description of the usage of a multi-level password scheme within a conventional family unit. Each family member is assigned a separate password that is defined as either a level one or as a level one and a level two password. A level one password allows the user to take pictures with the camera and to view the images from a cartridge containing a developed (processed) film strip. At level one, the user is prevented from removing the cartridge either at the end of the roll or from using the "MidRoll Cartridge Change" (MRC) functionality of the advanced photosystem. A level one user is not allowed to duplicate or manipulate an image entered into a workstation, copier, or an optical printer. By contrast, a level two user has no restrictions on usage, viewing, or duplication.

A block level transfer of a multi-level password is inputted into the camera 20 either by the previously described sound input devices or by input keypads 22. Once inputted, data is subsequently transferred to the film strip's magnetic tracks F00–F29 and C0–C3 (see FIGS. 5A and 5B). The sound signal (analog) from the microphone 17 is amplified and converted to digital form in the speech recognition chip 21. The digital form of the sound signal is compared against the stored passwords to determine if a password has been spoken. If so, the degree of camera access authorized by the password will be activated. The passwords are, as previously stated, generally stored in the digital memory 36. These passwords are recordable onto the magnetic tracks F00–F29 and C0–C3 of the film so as to maintain control over not only the camera functions, but also over the film and the images thereon. The reading and writing of magnetic data off of and onto film, within the context of the advanced photo system, is well known and documented and therefore will not be described in any further detail. Also, there are many well known ways to get information into a camera regardless of purpose. For example, the Ricoh RZ-105 camera uses an alphanumeric keypad as a data entry device. In Eastman Kodak Docket Number 68,052 (Dunsmore, et al.), U.S. Ser. No. 08/298,014, a voice recognition system is taught whereby specific scene annotation information is entered into the camera and transferred to the magnetic layer of the film.

To effectively use low cost speech recognition systems (chips) to implement speaker independent recognition for multi-level password situations with different people all pronouncing the same password, the camera's voice recognition circuitry must perform like a voice discrimination circuit only allowing the decoded person's voice those privileges which are tied to his/her authorized level of access. The camera's memory stores trained patterns of the same word along with a privilege definition table which tracks recognized authorized users and their privilege levels.

Figure 7:
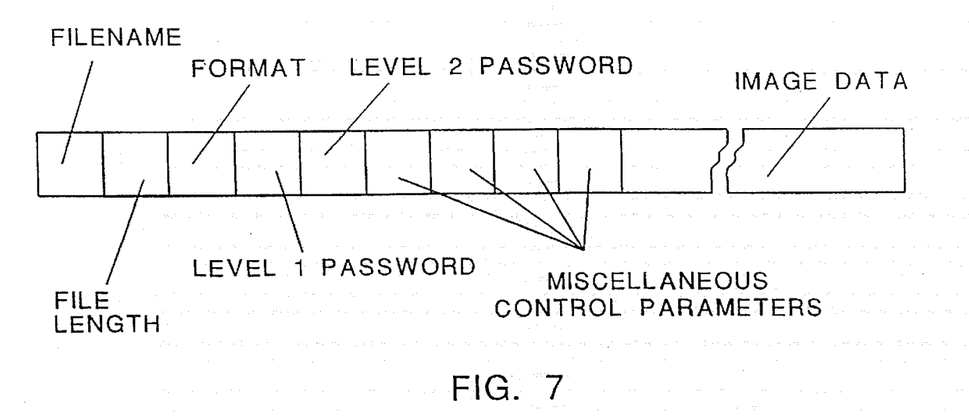
FIG. 7 illustrates one arrangement of a password sequence that may be used with the present system.

FIG. 7 represents a file structure derived from the scanning of a film strip with a plurality of passwords. The file header takes the following form: a file name leads the string of data bits followed by a file length field and a format field. Thereafter the level one password and the level two password are presented. Miscellaneous control parameters can then follow the password along with any relevant image data. The resulting file structure allows for software controlled access to the digital images while maintaining password protection of the film strip.

The following describes a method of scanning a filmstrip image with the encoded multilevel password whereby the password is read by a scanning device and is subsequently encoded with the resultant digital data file taking on the form shown in FIG. 7.

The object of this method is to produce a digital image file that maintains the password integrity of the originating analog filmstrip image.

Photofinishing Process

The first step in such a process is the acceptance of the Advanced photo System (APS) cartridge and/or filmstrip contained within. In the photofinishing sequence, for example, equipment produced for the purposes of generating index prints from processed APS filmstrips by companies such as Noritsu and Fuji Film contain the necessary elements to handle the filmstrip. Secondly, this equipment contains a light source for illuminating the developed filmstrip, an optical system for focusing the light passing through the film strip onto a linear CCD (area CCDs are also used for this purpose, but don't require movement of the film), and a means for either moving the linear CCD with respect to the film or moving the film with respect to the linear CCD. Completion of this scanning operation produces a digital image file which is in turn used to create the index print. The printing apparatus is also capable of reading from and writing to the magnetic tracks of the filmstrip. The final step in producing the desired digital file is the reading of the password(s) from the magnetic tracks and transferring that data to a reserved location in the file header associated with the scanned digital image data.

Peripheral Device Process

The first step in this aspect of the process again is the acceptance of the cartridge containing a filmstrip with developed images. This capability has been shown by announcement of two devices from Fuji Film: an image player Model AP-1 and an image scanner Model AS-1. Both of these devices accept the cartridge and cause the filmstrip to be thrust out of the cartridge for the purposes of scanning the image area thus creating an image digital data file. The second step of scanning a developed filmstrip image is also well known in the art. In addition to the functionality delivered by the aforementioned two devices, scanners for photoCD writers and devices such as the Kodak RFS 2035 film scanner clearly teach the usage of CCDs to produce a digital image data file from an analog filmstrip image. The use of magnetic heads to read the encoded password on the magnetic tracks is a well known essential element of the new Advanced Photo System and is found in multiple cameras and ancillary devices such as the previously mentioned scanner and player. The final step in the process is the insertion of the password(s) into a reserved location in the file header associated with the scanned digital image data.

The culmination of this method is the writing of the completed digital file by a manner familiar to those skilled in the art for writing PhotoCDs, disk drives, or other mass storage devices. The end benefit of this method is the preservation of the image password protection once the analog filmstrip image has been scanned and the digital data is separated from the magnetic encoded tracks of the analog filmstrip.

Figure 8A:
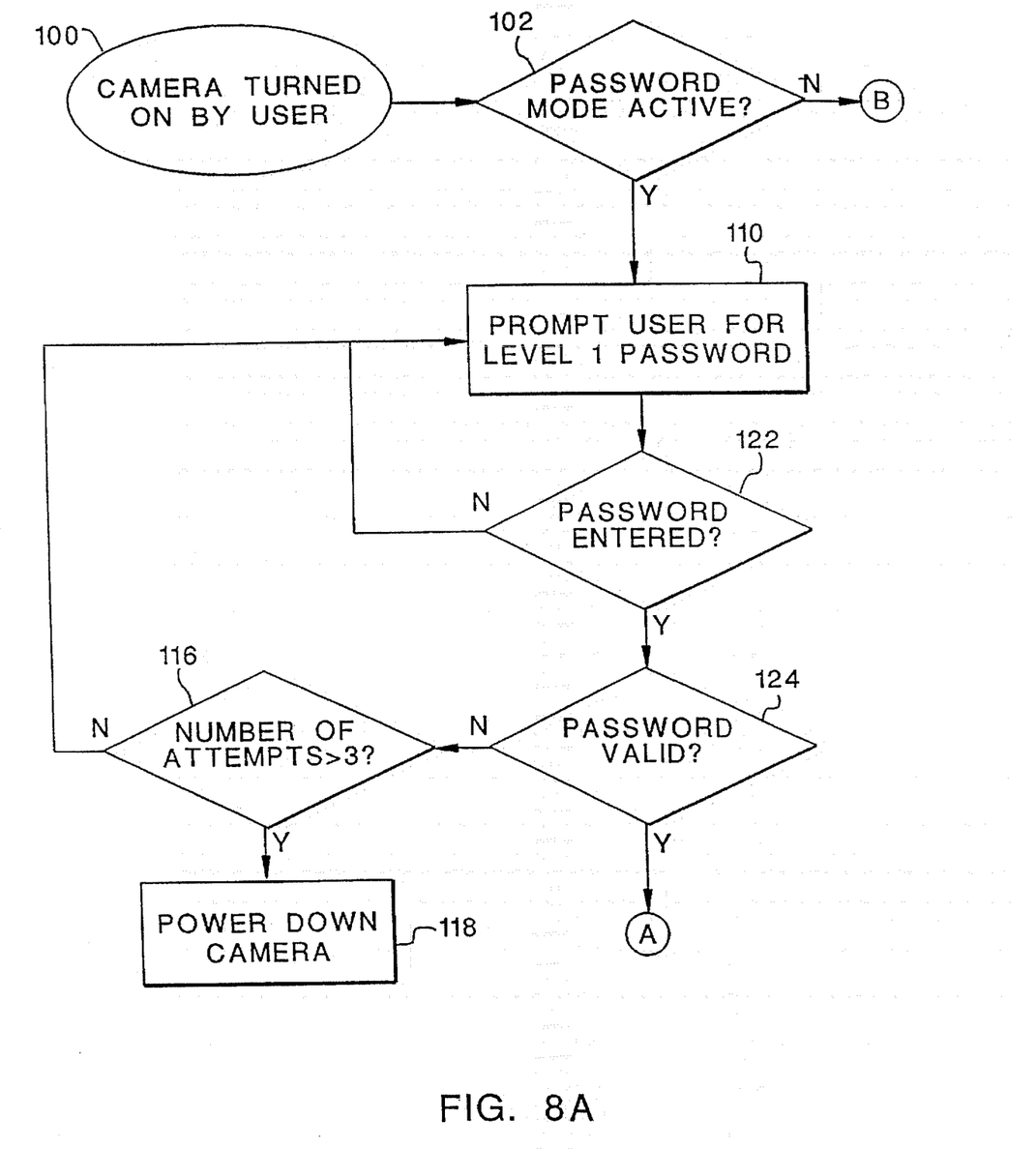
FIGS. 8A and 8B are flow charts that when taken together at the points labeled A and B represent the flow of operation of the password protection system.
Figure 8B:
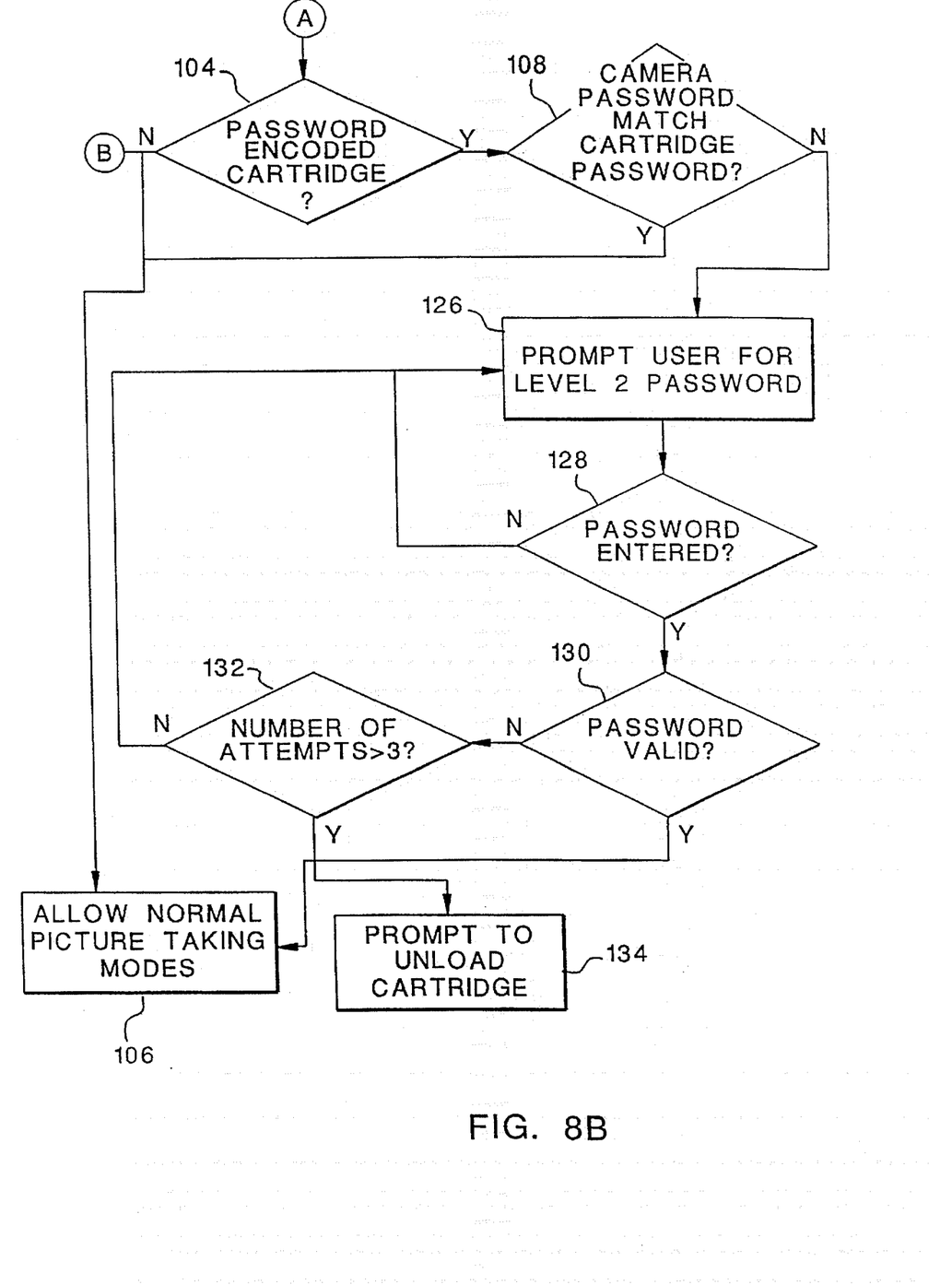

Referring now to FIGS. 8A and 8B, The preferred method of operating the camera system of the present invention starts with the camera's power being turned on in block 100. The camera's program checks to see if a password mode has been activated in block 102. If the answer is "no" the program proceeds onward to block 104 in FIG. 8B to determine if the film cartridge has been protected with a password. If the cartridge is not protected then picture taking in the normal fashion per block 106, is permitted. If access to the cartridge is password protected then the correct password must be entered before access by the camera will be permitted per block 108. As with any type of password protection system a limited number of attempts to enter the correct password may be authorized before denying access to the camera and or to the cartridge.

Referring back to FIG. 8A, if the password mode is active then the user is prompted for the level one password per block 110 and is permitted with a number of unsuccessful attempts per block 116 via blocks 122 and 124 before the camera is powered down by block 118 thus preventing further access attempts for a period of time. With the level one password being accepted as being correct per block 124, the camera's program looks to see if the cartridge is password protected and per the flow chart moves to the point Circle "A" in FIG. 8B. From this point on the checking for the correct level two password per block 126, 128, 130, and 132 for the cartridge remains as described in conjunction with the description of the camera's access with the addition of a prompt to unload cartridge 134 after three unsuccessful attempts.

Figure 9:
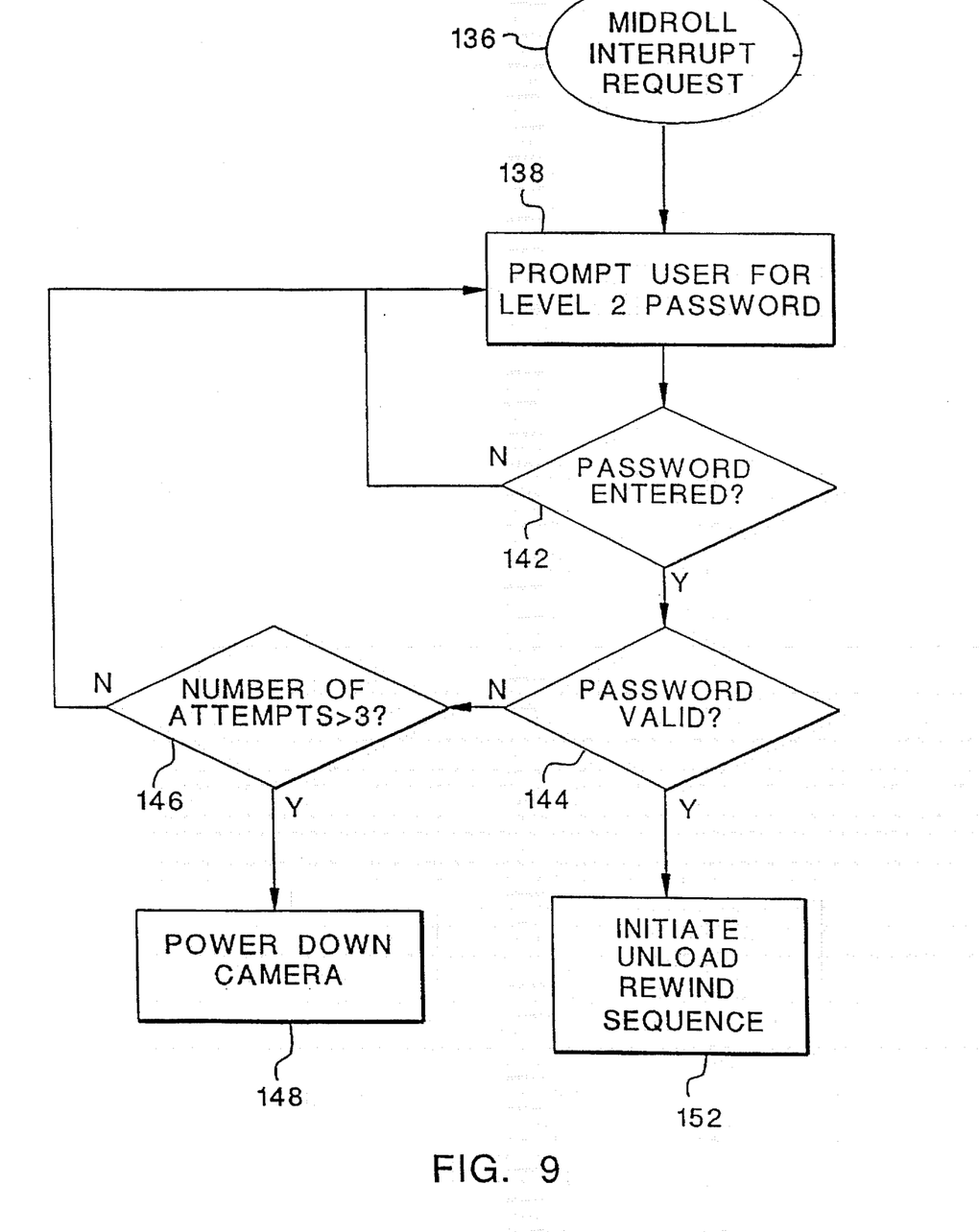
FIG. 9 is a flow chart illustrating the steps that occur when a midroll cartridge change request is made.

Referring to FIG. 9, the flow of the process for a midroll cartridge change request 136 commences with a request 138 for a level two password. If the correct password is not received within an assigned number of attempts 146 the camera is powered down 148. If the correct level two password is received per blocks 142 and 144 the camera executes the midroll rewind sequence 152 and upon completion permits the removal of the film cartridge. For those not familiar with the new camera system, a number of higher end cameras permit the photographer to change film cartridges before all of the film is exposed. The unexposed portion of the film is rewound in the cartridge and a mark on the film's magnetic tracks is made as to which frame was last used or unused. Inserting the cartridge back into the camera at a later date will cause the film to be advanced to exactly the same position that it had when it was removed.

Figure 10:
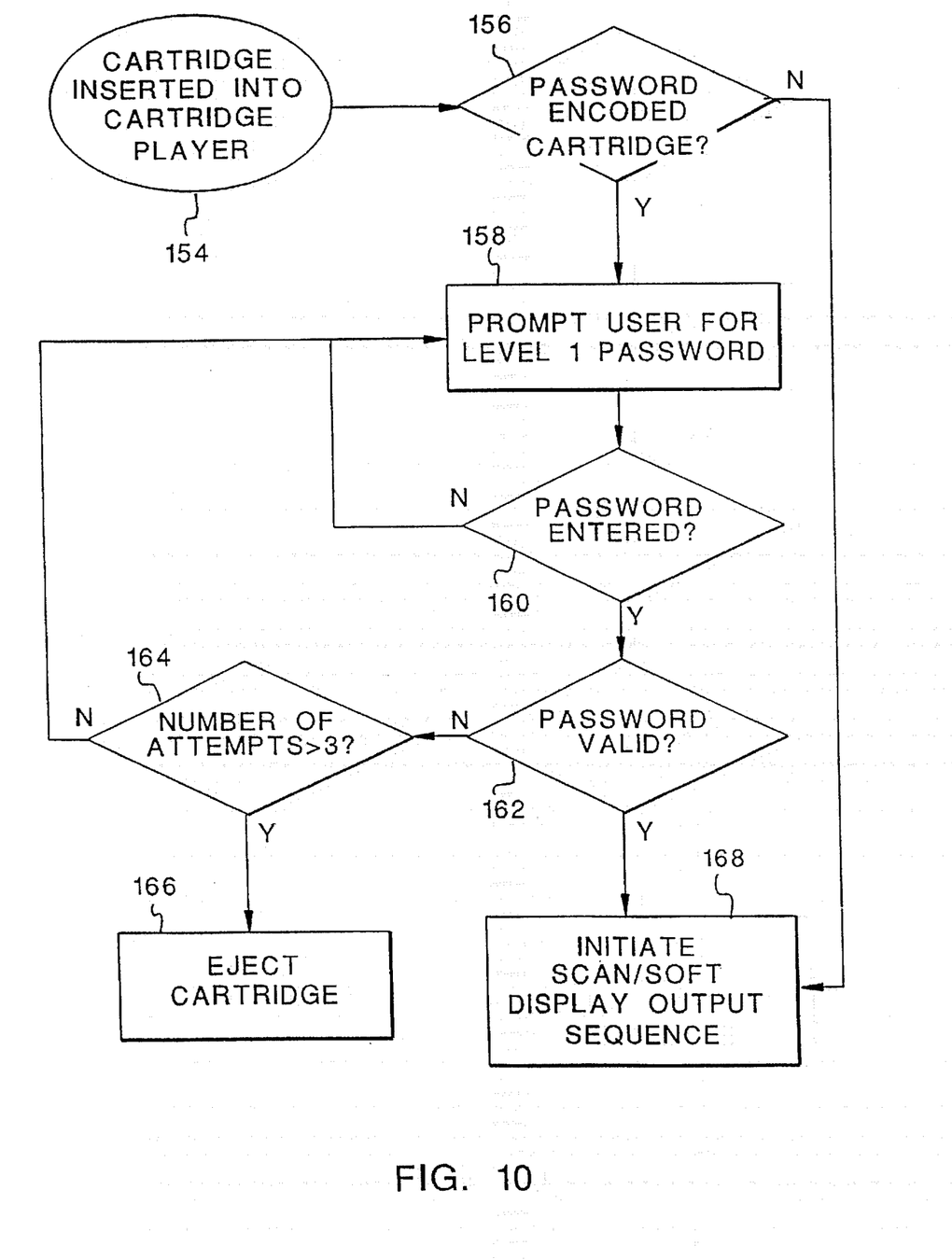
FIG. 10 is a flow chart illustrating password protection for a cartridge that is to be read by a cartridge player.

The flow chart of FIG. 10 illustrates the methodology for checking for password protection that may exist on a cartridge for controlling access to the cartridge in a cartridge player. The cartridge player is used to access the processed film strip in order to display the images on the film strip. The existence of a password controls the access to the cartridge to only those persons having a level one password. In operation, the cartridge is inserted into the cartridge player 154 and the magnetic layer on the film is read to determine if the cartridge is password protected by block 156. If the cartridge is not protected the images recorded on the film strip are accessed and displayed or copied according to the users requested operation per block 168. If the cartridge is password protected the user is prompted for a level one password per block 158 and is permitted to enter the correct password per blocks 160 and 162, or up to three incorrect passwords per blocks 160, 162, 164 before the cartridge is accessed and/or rejected from the cartridge player per block 166.

Figure 11:
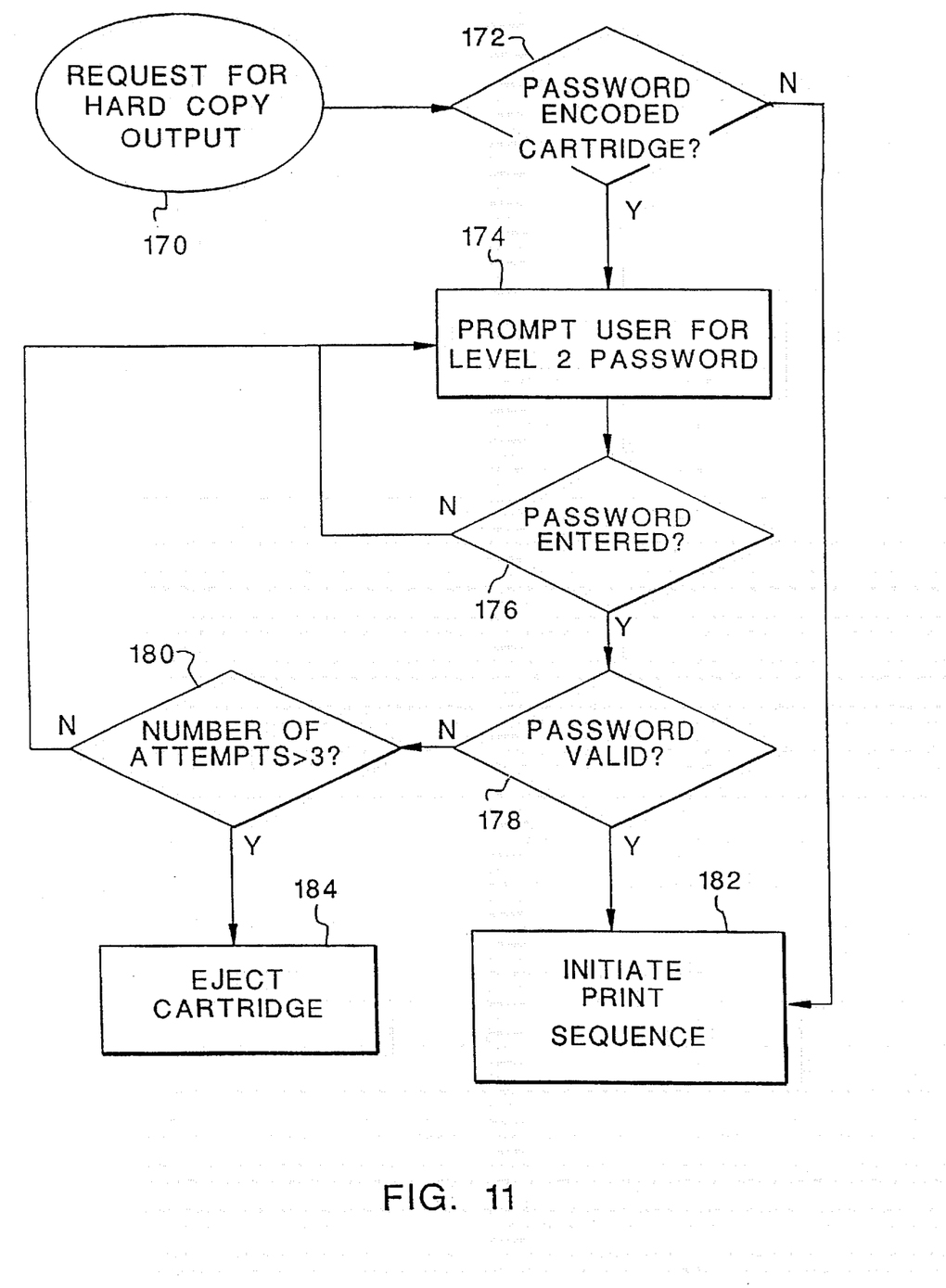
FIG. 11 is a flow chart illustrating the password protection for a cartridge that is to be accessed for the purpose of forming hard copies of the images on the film strip within the cartridge.

FIG. 11 illustrates, in flow chart form, the methodology of accessing a film cartridge for the purpose of printing one or more of the images recorded on the film strip. In this instance the accessing password is a level two password. The request 170 for a hard copy commences with a determination of whether the cartridge is password protected or not in block 172. The user is prompted for the password per block 174 and upon receipt and confirmation that the password is valid per block 178 a print sequence is initiated per block 182. If the password is not valid the user is permitted a number of additional attempts per block 180 before the cartridge is ejected per block 184.

Figure 12:
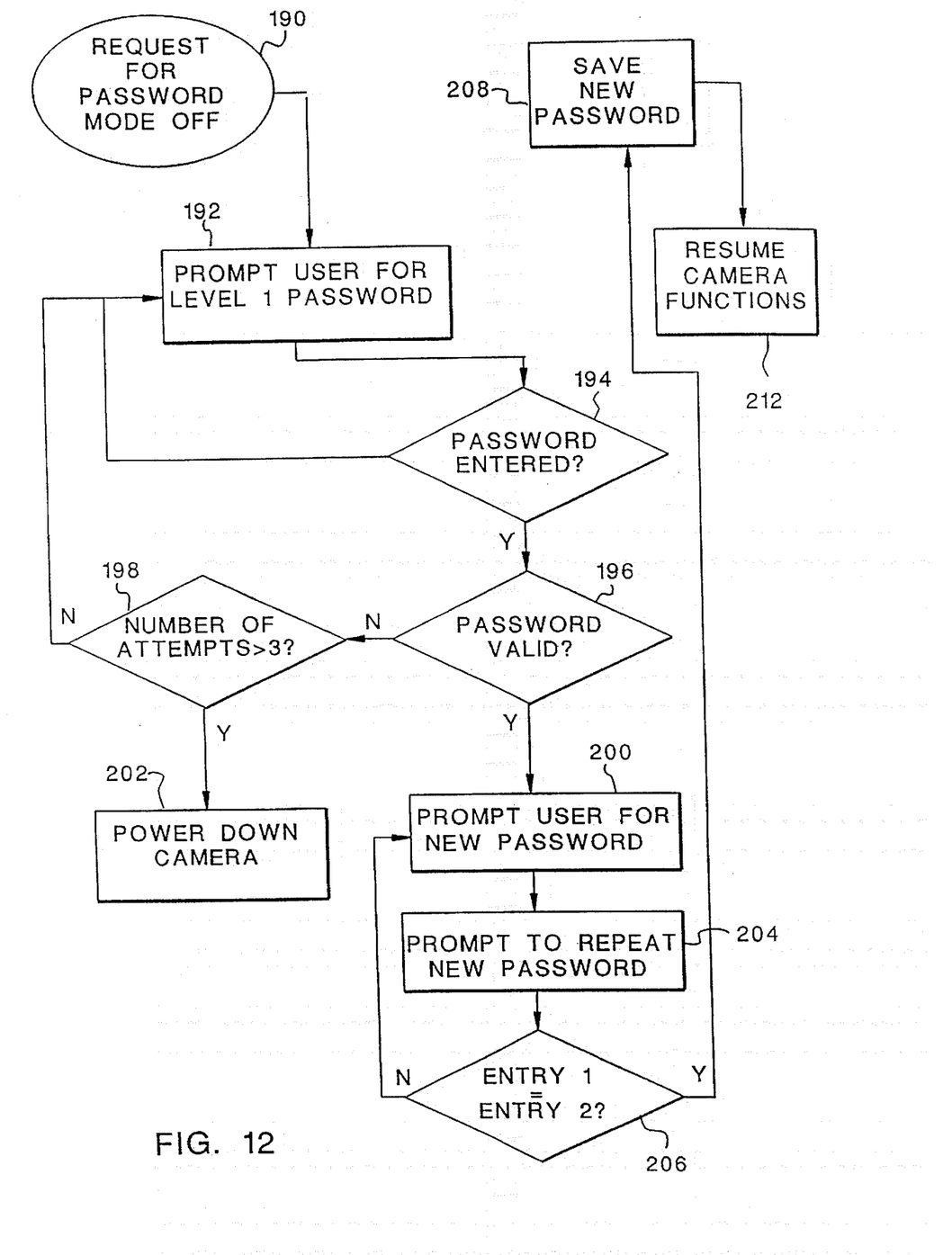
FIG. 12 is a flow chart illustrating the procedure for requesting that an active password mode be turned "Off."

Referring to FIG. 12, up to this point the discussion has been directed to the detection of the existence or non-existence of level one and/or level two passwords. It may occur at some point in time that the user may wish to turn the password mode off, block 190 or to select a different password. To do so the user is prompted to enter the level one password per block 192 and upon validation per block 194 and 196 is prompted through a sequence that either permits the removal of all password requirements or permits the user to select a new password per blocks 200, 204, 206, 208, and 212 and to have it compared for accuracy. Like the preceding methodologies the user is provided with a number of error entries per blocks 196, 198, and 202 before the camera is powered down.

Based on the preceding teachings it will be apparent to a person skilled in the art that more than two levels of password protection may be applied at the selection of the user. It is also apparent that the number of retries after the entry of a non-valid password may be increased and or decreased above the 3 indicated in the flow charts.

At level one, the camera is activated and can be operated. From the downstream perspective, the images contained on the cartridge can be viewed under the level one privilege structure. For example, a device capable of scanning and displaying the cartridge's images on a television set could also be hooked up to a personal printer. For a level one privilege, the TV would be allowed to display the images, but the printer driver software would refuse to print the image. Level two incorporates the privileges of level one plus cartridge removal via camera MRC and image duplication in downstream devices. Examples of apparatus that could be required to have level two privilege are automatic printers, computer workstations, image telecommunications equipment, etc.

For purposes of recording data in the magnetic layer 26, each frame of the film strip 42 may be formatted more fully described in a commonly assigned U.S. Pat. No. 4,977,419, the disclosure of which is incorporated herein by reference. As described in the '419 patent, certain of the tracks (C0–C3 and F00–F29) may be reserved for recording of information in the camera using magnetic recording means included in the camera. In addition, other tracks may be reserved for use by the photofinisher. Additionally, the '419 patent indicates that certain of the tracks may be used for the recording of audio information. Apparatus for magnetically recording information in the camera is more fully described in the '419 patent and is not repeated here except to the extent elements thereof are relevant to an understanding of the present invention.

The invention has been described with reference to a preferred embodiment; However, it will be appreciated that variations and modifications can be effected by a person of ordinary skill in the art without departing from the scope of the invention.

Parts List:
2 film index window
4 flash hot shoe
11 lens
12 function switch
16 LCD
17 microphone
18 shutter button
20 camera
21 speech recognition chip
22 key pads
23 camera system microcontroller
24 speaker
26 magnetic layer
27 film read/write interface circuits
28 film advance motor controller
29 film advance motor
34 film cartridge
36 digital memory
42 film strip 112 base layer
120 photo chemical layer
140 anti-static and lubricating layer
150 perforation
210 magnetic read/write heads
215 microprocessor
220 read/write electronics
222 memory
224 memory
F00–F29 transparent overlay of magnetic tracks
C0–C3 transparent overlay of magnetic tracks
31 amplifier
32 multiplexer
33 ADC Circuit
35 digital logic Lrcuit
38 RISC processor
39 power supply
40 DAC
41 RAM
43 ROM
44 AGC circuit
45 amplifier
100 camera on
102 question, password mode
104 question, password encoded cartridge
106 normal mode picture taking
108 question, match entered password
110 prompt user for level 1 password
116 question, number of attempts>3
118 power down camera
122 question, password entered
124 question, password valid
126 prompt user for level 2 password
128 question, password entered
130 question, password valid
132 question, number of attempts>3
134 prompt to unload cartridge
136 midroll interrupt request
138 prompt user for level 2 password
142 question, password entered
144 question, password valid
146 question, number of attempts>3
148 power down camera
152 initiate mid-roll rewind sequence
154 cartridge inserted into cartridge player
156 question, password encoded cartridge
158 prompt user for level 1 password
160 question, password entered
162 question, password valid
164 question, number of attempts>3
166 eject cartridge
168 initiate scan/soft display output sequence
170 request for hard copy output
172 question, password encoded cartridge
174 prompt user for level 2 password
176 question, password entered
178 question, password valid
180 question, number of attempts>3
182 initiate print sequence
184 eject cartridge
190 request for password mode off
192 prompt user for level 1 password
194 question, password entered
196 question, password valid
198 question, number of attempts>3
200 prompt user for new password
202 power down camera
204 prompt to repeat new password
206 password entry compare for new password
208 save new password
212 resume camera functions

We claim:

1. A multi-level password protected camera comprising:

a camera;

a film cartridge lockably installed in said camera;

means incorporated within said camera for permitting the use of said camera for picture taking upon acceptance of a first level password; and means incorporated within said camera for unlocking the camera's film cartridge permitting its removal from said camera upon acceptance of a second level password.

2. A method for multilevel password protecting access to the full feature set of a camera of the type that receives strips of photographic film wound within a light-proof cartridge, comprising the steps of:

a) providing a password to the camera;

b) comparing the provided password with previously stored multilevel passwords;

c) activating a limited set of camera functions if there is a favorable comparison with a first level password;

d) denying activation of said camera if there is an unfavorable comparison;

e) activating a full set of camera functions if there is a favorable comparison with a second level password;

f) denying activation to the full set of functions if there is an unfavorable comparison; and g) means for writing a first and a second level password to the received strips of photographic film.

3. The password protected camera system according to claim 2 wherein said passwords are sound entered passwords.

4. The method according to claim 2 and further comprising the step of:

preventing the removal of the film cartridge from the camera unless at least two passwords of different levels have been successfully compared with the previously stored multilevel passwords of the camera.

5. The camera having a set of password protected features according to claim 2 and further comprising:

means for reading a first and a second level password previously encoded on a partially exposed camera film;

means for determining correspondence between the first and the second level passwords encoded on the film and the first and second level passwords assigned to the camera; and means for granting access upon determining correspondence and for prompting the user to input a second level password upon the lack of correspondence.

6. A camera having multisets of camera features with each feature set requiring a different password for access, the camera comprising: a photographic film cartridge including a strip of photographic film having a magnetic recording area wherein an access password is recorded and access to the photographic film cartridge and strip of photographic film is one feature set of said multisets of camera features.

* * * * *